Jan. 21, 1964 A. P. MOSCA 3,118,614

PEN FLASHLIGHT TELEPHONE ATTACHMENT AND THE LIKE

Filed Nov. 23, 1960 4 Sheets-Sheet 1

INVENTOR.
ANTHONY P. MOSCA

BY
Zoltan Polachek
ATTORNEY

PEN FLASHLIGHT TELEPHONE ATTACHMENT AND THE LIKE

Filed Nov. 23, 1960 4 Sheets-Sheet 2

INVENTOR.
ANTHONY P. MOSCA
BY
Zoltan Polachek
ATTORNEY

Jan. 21, 1964 A. P. MOSCA 3,118,614

PEN FLASHLIGHT TELEPHONE ATTACHMENT AND THE LIKE

Filed Nov. 23, 1960 4 Sheets-Sheet 3

INVENTOR.
ANTHONY P. MOSCA
BY

ATTORNEY

PEN FLASHLIGHT TELEPHONE ATTACHMENT AND THE LIKE

Filed Nov. 23, 1960 4 Sheets-Sheet 4

INVENTOR.
ANTHONY P. MOSCA
BY
Zoltan H. Polachek
ATTORNEY

United States Patent Office 3,118,614

Patented Jan. 21, 1964

3,118,614

PEN FLASHLIGHT TELEPHONE ATTACHMENT AND THE LIKE

Anthony P. Mosca, 77—12 Kneeland Ave., Elmhurst, N.Y.

Filed Nov. 23, 1960, Ser. No. 71,313
1 Claim. (Cl. 240—2.17)

This invention concerns an illuminating appliance adapted for use as an attachment to a telephone or telephone handset.

According to the invention, there is provided a cylindrical lamp and bracket supporting the lamp on a telephone or telephone handset. The lamp includes a mercury switch which is operative to extinguish the light when the lamp is in a horizontal position. If the lamp is supported horizontally on the telephone handset with the light point toward the receiving end, when the handset is lifted off of the cradle for dialing, the light remains extinguished but on turning the handset upside down, the lamp lights to illuminate the dial on the telephone.

The lamp is removable from the telephone or telephone handset since it may not be needed by day, and can be replaced for nighttime use. The lamp may include a battery or may be electrically connected to an external source of electric current. When connected to the external source of electric current the lamp will always light when the handset is lifted from its cradle and turned to a vertical position.

According to a modified form of the invention, the lamp may be swung off of the telephone to a vertical illuminated position or various positions at an angle to the horizontal and held in such positions.

It is therefore one object of the invention to provide a lamp for use in association with a telephone handset adapted to light when the handset is lifted and one end thereof pointed downwardly.

It is another object to provide a lamp of the character described with a mercury switch adapted to close an electric circuit when the lamp is disposed in a position at an angle to the horizontal.

It is a further object to provide a lamp of the character described including means for energizing the lamp by a self-contained battery or by an external source of current.

It is still a further object to provide novel support means for a lamp on a telephone cradle or telephone handset.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
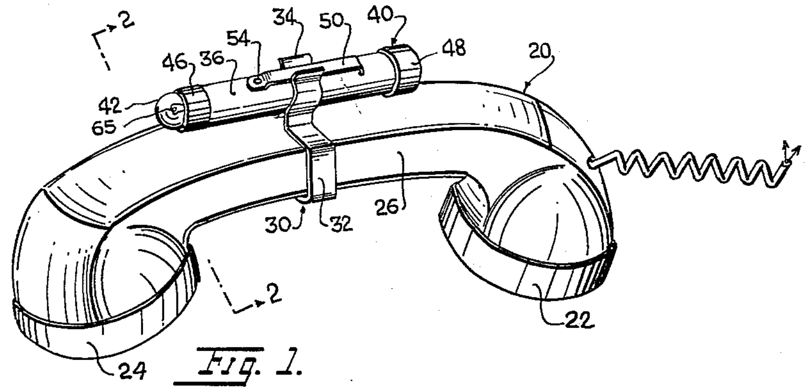
FIG. 1 is a top perspective view of an elongated pen-type lamp embodying the invention removably mounted upon a telephone handset.
Figures 2, 3, 4, 5, 6:
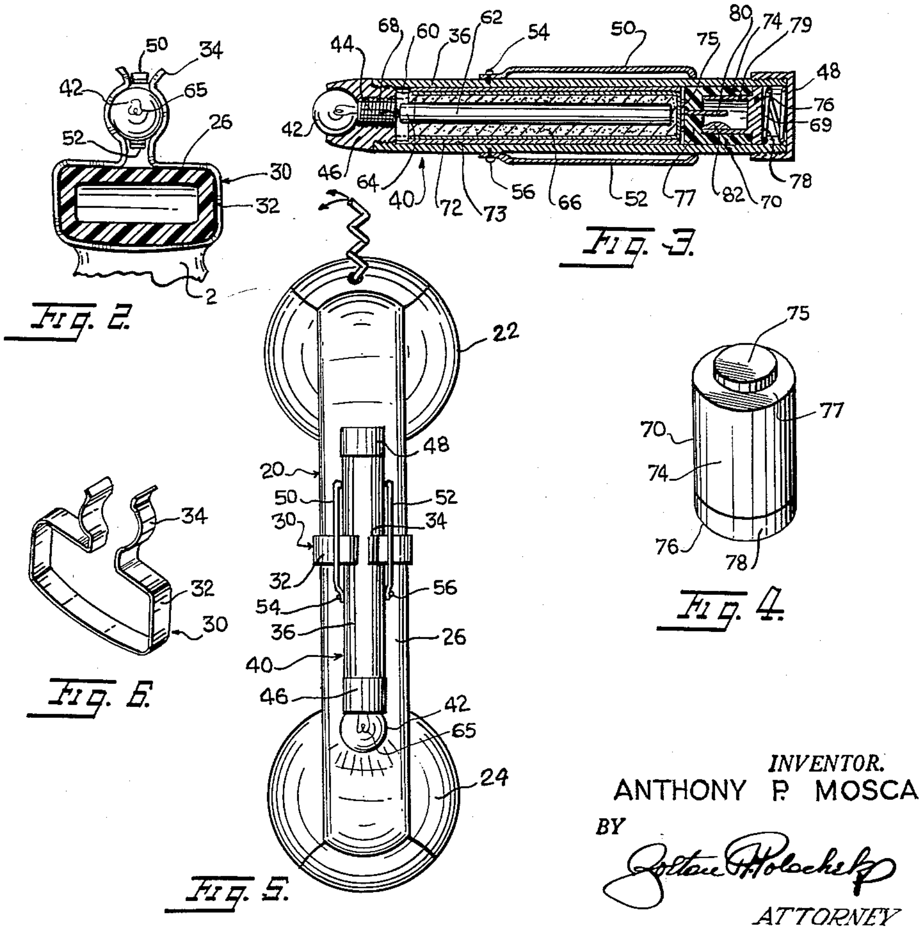
FIG. 2 is a transverse sectional view taken on line 2—2 of FIG. 1.
FIG. 3 is a longitudinal central sectional view on an enlarged scale of the lamp per se.
FIG. 4 is a perspective external view of a mercury switch capsule used in the lamp.
FIG. 5 is a plan view of the lamp mounted on the telephone handset in a position rotated 90° from that of FIG. 1.
FIG. 6 is a perspective view of the bracket for the lamp.

Referring to FIGS. 1–5, there is shown a conventional telephone handset 20 having a transmitter end 22 and a receiving end 24 joined by an elongated hollow bridge 26 which is generally rectangular in cross section. A bracket 30 in the form of a springy metal band is engaged around the bridge as shown in FIGS. 1 and 2. This bracket, as best shown in FIGS. 1, 2, 5 and 6 has a rectangular body loop 32 terminating at its upper ends in bent springy fingers 34. These fingers are arcuate and spaced from each other. They removably receive the cylindrical barrel 36 of lamp 40.

Lamp 40 has a bulb 42 whose base 44 is screwed into a sleeve 46 (see FIG. 3). The sleeve is threaded externally and screwed into one end of barrel 36. At the other end of barrel 36 there is a removable metal cap 48. Spring clips 50, 52 are secured by rivets 54, 56 to opposite sides of the barrel and extend longitudinally along the barrel as best shown in FIGS. 3 and 5.

Within the barrel there is a conventional cylindrical dry battery 60 including a central carbon core 62, positive terminal 64 and paste filler 66. The positive terminal 64 is held in abutment with the central terminal 68 of the bulb by pressure of a coil spring 69 mounted in the cap and urging the battery against the terminal 68 of bulb 42 via a mercury switch capsule 70. The battery includes a metal case 72 and an outer cylindrical paper or plastic sleeve 73 which serves as an insulator between the metal case 72 and the metal barrel 36.

The mercury switch capsule 70 as best seen in FIGS. 3 and 4 comprises a hollow cylindrical body 74 of plastic insulating material having a flat closed end 77, the other end being open. The open end of the body is closed by a metal cap 76 having a tubular extension 79 extending into the body 74 and constituting a lining for such body. The cap 76 has a flat outer surface 78 forming a seat for the coil spring 69, the other end of the spring impinging against the cap 48. A stationary electrical contact is mounted on the closed end 77 said contact comprising a flat metal disk 75 seated on the outer surface of the closed end and a metal pin 80 extending from the center of the disk through a central opening in the closed end to the interior of the body 74 and spaced from the lining extension 79 and cap 76. The contact disk 75 contacts the adjacent end of the case 72 of the battery. A free glob of mercury 82 is disposed in the chamber defined by the body 74 and cap 76.

In using the horizontal position of the lamp 40 shown in FIGS. 1 and 3, the glob of mercury is spaced from the pin 80 which serves as a switch contact.

When the handset 20 is lifted off of the cradle of the telephone and the receiving end 24 is placed to the ear of the user, the free glob of mercury 82 flows toward the end of the cap 76 spaced away from the end of the contact pin 80 and the light 42 remains extinguished while the telephone conversation is being carried on. If it is desired to illuminate an area such as data on a supporting table or the like, the handset 20 is tilted with the receiving end 24 downwardly such as shown in FIG. 5 whereupon the glob of mercury 82 flows into contact with the contact pin 80 thereby closing the circuit through the lamp or bulb 42 illuminating the same. If the telephone set is in the dark and it is desired to dial, by merely taking the handset off of the cradle and tilting the receiving end 24 downwardly, the dial will become illuminated.

When the handset is tilted with the receiving end below the horizontal, the circuit through the lamp or bulb 82 is completed and this circuit may be traced as follows: from battery terminal 64 to central terminal 68, through filament 65 of bulb 42, base 44, sleeve 46, barrel 36, spring 69, cap 76, mercury 82, pin 80, disk 75, metal battery case 72, paste filler 66 and carbon rod 67 to terminal 64.

The lamp 40 can readily be inserted in and removed from bracket 30. In FIG. 5, the lamp is shown rotated 90° from the position of FIGS. 1 and 2. The clips 50, 52 are then engaged on the spring fingers 34. When the lamp is in the position of FIGS. 1 and 2, the clips 50, 52 prevent rotational movement of the lamp in fingers 34. In the position of FIG. 5, the clips prevent rotational movement and limit longitudinal movement. In any case, the lamp 40 will be held frictionally by the spring fingers 34 so that the lamp assumes a vertical position when the telephone handset is lifted from its cradle (not shown) and turned to a vertical position.

Figure 7:
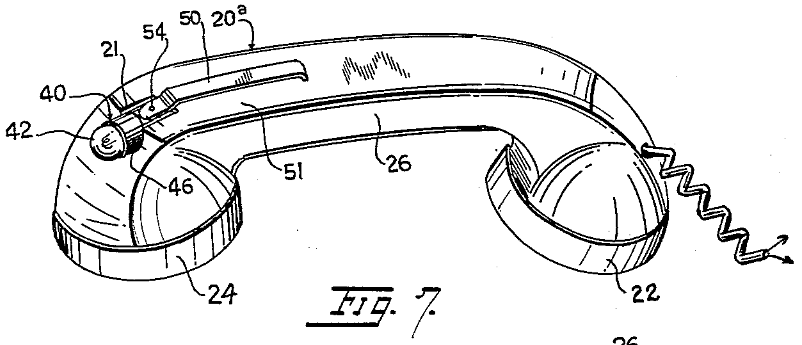
FIG. 7 is a top perspective view similar to FIG. 1 showing the lamp mounted on a modified form of handset.
Figures 8, 9:
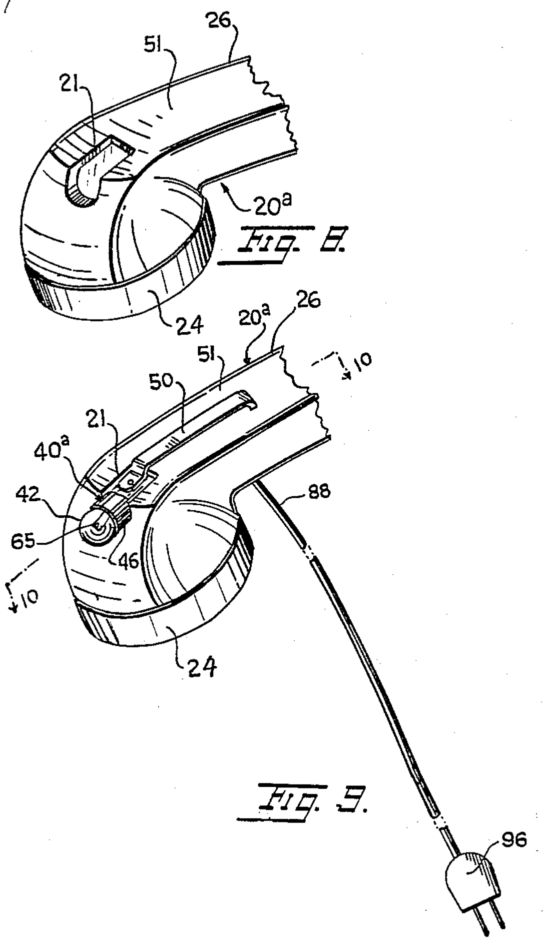
FIG. 8 is a perspective view of the left-hand end of the handset of FIG. 7, the lamp being omitted.
FIG. 9 is a perspective view of the left-hand end of the handset of FIG. 7 with a modified form of lamp having means for energizing the lamp from an external source of electric current.

In the form of the invention shown in FIGS. 7 and 8, the telephone handset 20ª is formed with a cutout 21 in one end of bridge 26 in which the lamp 40 is removably mounted. Clip 50 on lamp 40 engages on the upper wall 51 of the bridge of the handset while bulb 42 projects outwardly. Bracket 30 is not required since the lamp is contained within the hollow bridge 26. Clip 52 is omitted.

Figure 10:
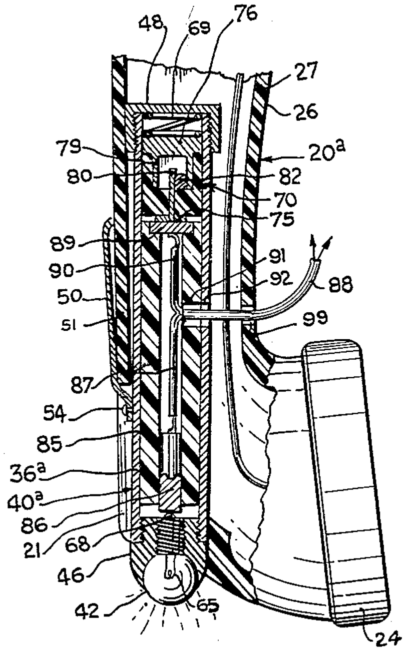
FIG. 10 is a sectional view on an enlarged scale taken on line 10—10 of FIG. 9.

In the form of the invention shown in FIGS. 9 and 10, handset 20ª removably supports a modified form of lamp 40ª which is energized from an external source of current. The battery is omitted. In its place there is a cylindrical contact member including a tubular insulated element 85 disposed in barrel 36ª. A metal plug 86 is axially disposed in one end of element 85 and is urged to contact terminal 68 of the bulb 42 by spring 69 in cap 48. Wire 87 of a cable 88 is connected to the inner end of plug 86. A metal disk 89 is secured at the other end of element 85. Wire 90 of cable 88 is connected to disk 89. The disk 75 of mercury switch capsule 70 abuts disk 89. Cable 88 passes through registering apertures 91, 92 in tubular element 85 and metal barrel 36ª of the lamp 40ª. The cable passes through hole 99 in bottom wall 27 of bridge 26. Cable 88 terminates in a plug 96 which can be inserted in any convenient electrical outlet to supply electric current to light lamp 40ª.

Clip 50 engaged on the upper wall 51 of the bridge of the handset holds the lamp 40ª in a horizontal position. When the handset 20ª is in the vertical position shown in FIG. 10, the lamp will light because the circuit is closed through the mercury body 82 shown contacting pin 80 and extension 79 of member 76. The lamp will remain unlit while the handset is on its cradle in horizontal position. Parts of lamp 40ª and handset 20ª corresponding to lamp 40 and handset 20, respectively, are identically numbered.

Figures 11, 12, 13, 14:
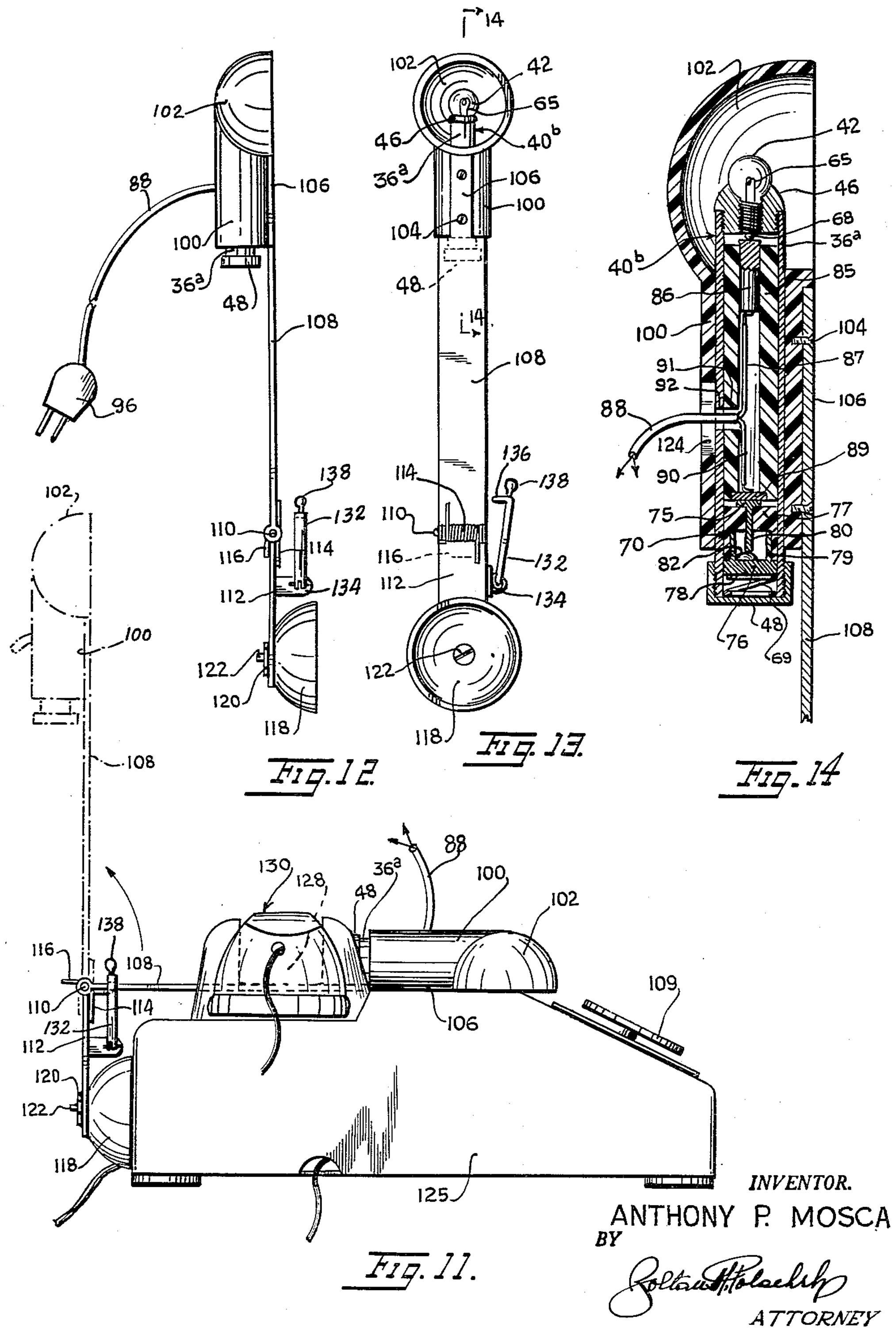
FIG. 11 is a side elevational view of a telephone with a modified form of lamp hingedly mounted therein, showing the lamp in moved operative position in dot dash lines.
FIG. 12 is a side view of the lamp and mounting thereof of FIG. 11 in extended position.
FIG. 13 is a front elevational view of the extended lamp of FIG. 12.
FIG. 14 is a sectional view on an enlarged scale taken on line 14—14 of FIG. 13.

In FIGS. 11–14 there is shown another modification of the invention. Lamp 40ᵇ is constructed like lamp 40ª and similar parts are identically numbered. The lamp is axially disposed in a tubular support 100 having its upper end formed as a hemispherical or parabolic reflector 102. The bulb 42 is disposed inside the reflector. The lamp can be axially adjusted in position in the tubular support in which the outer barrel 36ª is frictionally gripped. The tubular support is secured by screws 104 to the upper end 106 of an upper arm 108. The arm is hinged by pintle 110 to a lower bracket arm 112. A coil spring 114 on the pintle biases the arms 108 and 112 in aligned parallel disposition as shown in FIGS. 12 and 13. A finger 116 formed at the lower end of arm 108 bears on the upper end of arm 112 and prevents the arm 108 from rotating backwardly or counter-clockwise from the position shown in FIG. 12. The arm 108 is, however, pivotable forwardly to a horizontal position as shown in FIG. 11.

The lower end of bracket arm 112 is secured to a rubber suction cup 118 by nut 120 and bolt 122. Cable 88 passes through a slotted opening 124 in support 100; see FIG. 14.

In FIG. 11 the suction cup 118 is shown attached to the rear side of a telephone cradle 125 on which is disposed the telephone handset 130. The bridge 128 of the handset overlays the arm 108 and holds it in a horizontal position against the bias in spring 114. Bracket arm 112 is disposed vertically. Lamp bulb 42 is extinguished since the switch capsule 70 is disposed in a horizontal position. When the handset is lifted from the cradle 125, the arm 108 rises to a vertical position disposing the mercury switch capsule 70 in an axially vertical position. This causes mercury body 82 to close the contact between elements 79 and 80 as shown in FIG. 14. The lamp power supply circuit is thus closed and the lamp lights. The lamp can be permanently lighted when in the erect position without disturbing or affecting use of the telephone in any way. When it is desired to control lighting by lifting the handset 130, then arm 108 will be swung to horizontal position and the handset will be placed thereover as shown in FIG. 11. The arm 108 and lamp can be held in horizontal inoperative position by means of a latching finger member 132 hinged at one end to bracket 134 on lower arm 112. The finger is provided with a hook 136 adapted to be swung over the arm 108 to releasably hold it down. A knob 138 is formed on the free end of the finger 132 for actuating the same. When the handset is lifted the arm 108 rises to vertical position and the lamp lights to illuminate dial 109 of the telephone and a surrounding horizontal area.

Figure 10A:
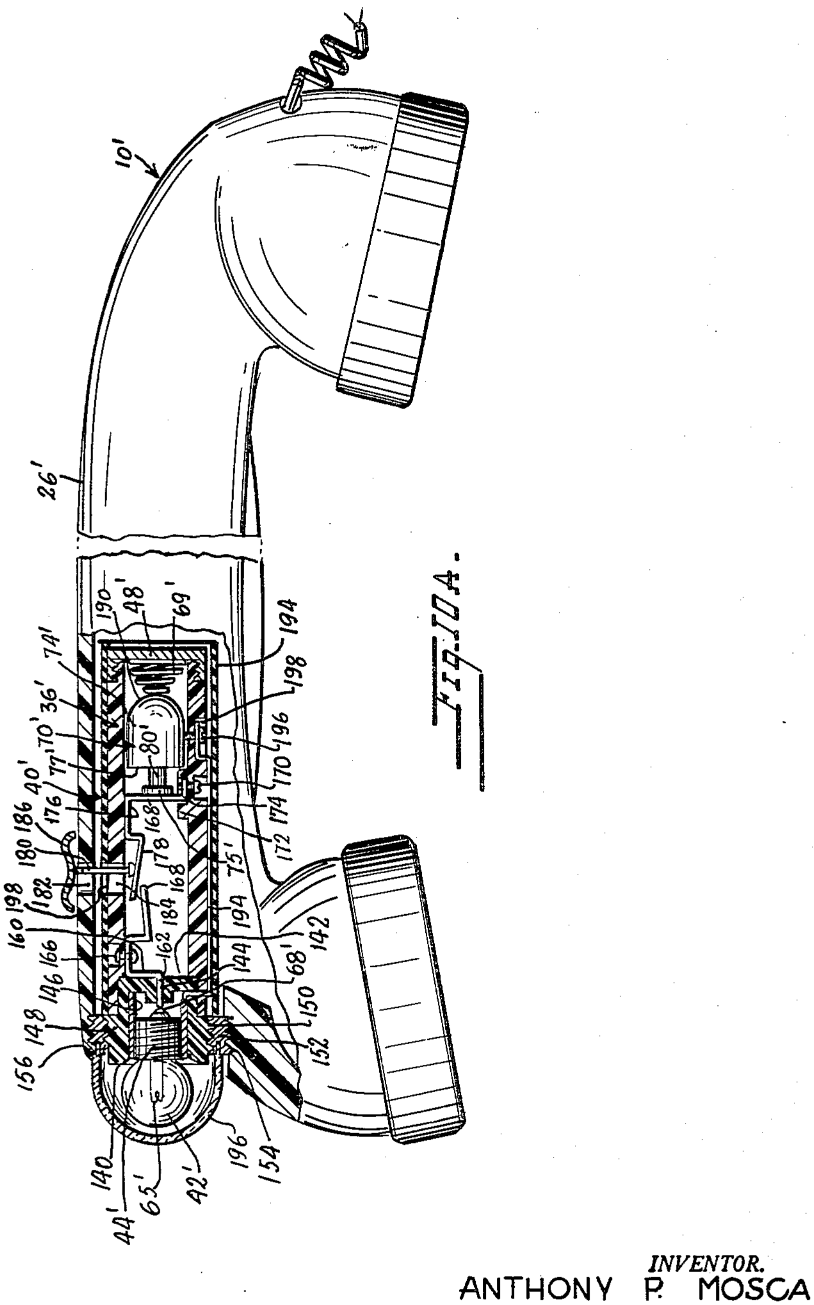
FIG. 10A is a part elevational and part sectional view of another modification of the invention.

Referring now to the modification of the invention shown in FIG. 10A, this form is somewhat similar to the form of FIG. 10 and shows a modified handset 10′ removably supporting a modified form of lamp 40′ which is energized from an external source of current. The lamp 40′ comprises an insulating tubular barrel 36′. At one end the barrel is closed by a socketed bearing member 140 closed at its base 142. The base is formed with a central opening 144. A metal sleeve 146 lines the inner surface of the body of the bearing member. The tubular body of the bearing member is formed with an annular enlarged portion 148 at one end on the outer surface thereof which portion is formed with external threads 150 to receive a threaded nut 152. Nut 152 is provided with external threads 154 to fasten the lamp to the threaded end 156 of the bridge 26′ of the handset. At the other end of the barrel, there is a coil spring under a removable metal cap 48′.

An angular bus bar of spring metal having an inverted U-shaped body 160 and laterally projecting extensions 162 and 164 thereon is fixed to the top of the body of the barrel 36′ by a rivet 166 positioned so that its extension 162 extends through the central opening 144 in the base 142 of the bearing member 140 and projects therebeyond into the metal sleeve 146. The other extension 164 extends toward the midlength of the barrel. Another angular bus bar 168 of spring metal is fixed to the bottom of the body of the barrel 36′ by means of a screw 170 extending through an enlarged portion 172 adjacent the other end of the barrel, the screw being secured to a foot portion 174 of the bus bar 168. The top of the bus bar 168 is formed with an extension 176 extending toward the midlength of the barrel. The extension 176 has an offset end 178 that extends over the extension 164 of bus bar 160, the end of the extension 164 being disposed in the path of movement of the end 178 of bus bar 168. An actuating rod 180 of insulating material extends through aligned elongated slots 182 and 184 in the walls of the bridge 26' and of the barrel 36' with its inner end engaging the offset end 178 of the bus bar 168. A finger piece 186 is fixed on the outer end of the rod 180 for sliding the inner end of the rod over the offset end 178 of the bus bar 168 so as to press said end into contact with the extension 164 on bus bar 160. The bus bars, rod 180 and finger piece 186 constituting an electrical switch. A lamp bulb 42' has its base 44' threaded into the sleeve 146 with its central terminal 68' in contact with the protruding end of the extension 144 of bus bar 160, which end constitutes an electrical terminal.

A mercury switch capsule 70' is mounted in the barrel 36' adjacent the bus bar 168. The mercury switch capsule 70' comprises a hollow cylindrical body of plastic insulating material with a flat closed end 77' and a rounded closed end 190. A stationary electrical contact is mounted on the closed end 77; said contact comprising a disk 75' on the outer end of a metal pin 80' extending from the center of the disk through a central opening in the closed end of the interior of the body 74' of the mercury switch. The mercury switch has another contact member inside the body 74' thereof and a free glob of mercury which is adapted to close a circuit between the contact members of the mercury switch. A bus bar 194 connects the sleeve 146 and the switch parts of the mercury switch by means of a terminal screw 196 extending through a slot 198 formed in the wall of the barrel 36'. Current for the lamp 42' is provided by a conductor (not shown) connected to the terminal screw 170 and by another conductor (not shown) connected to the terminal screw 196.

The circuit for the lamp bulb 42' may be traced as follows: from the terminal screw 170, to the bus bar 168, extension 176, extension 164, bus bar 160, extension 144 central terminal 68' of lamp bulb, incandescent wires 65', base 44' of lamp, sleeve 146, bus bar 194, terminal screw 196, mercury switch parts to contact 80 to bus bar 168 back to screw 170. The circuit is controlled by tilting the mercury switch and by relieving pressure of the actuating rod 180 on the extension 178 of bus bar 168.

An insulating tube 194 is preferably sleeved around the barrel 36' and a transparent plastic semi-spherical cover 196 may be placed over the lamp bulb 42' to protect the barrel and lamp bulb respectively. The tube 194 is formed with a slot 198 to make clearance for the actuating rod 180.

The several lamps described are constructed so that they can readily be assembled and disassembled for servicing. The lamps are easily inserted on and removed from the handset or other support.

If desired, the lamps 40, $40^a$ and $40^b$ can be detached from the telephone cradle or handsets and used independently thereof, to light in proper axially vertical position and to be extinguished in axial horizontal positions.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

In combination, a telephone handset, a spring bracket having a looped body embracing the handset, said body having spaced, arcuate spring fingers, a lamp removably embraced between said fingers, above the handset, said lamp comprising a cylindrical, tubular barrel having an electric bulb removably disposed at one end, a cap removably disposed at the other end of the barrel, a cylindrical mercury switch capsule disposed in the barrel adjacent the cap, a cylindrical battery in the barrel in axial alignment with the switch capsule and having a central terminal contacting a terminal of the bulb, spring means in the barrel urging said battery to contact said terminal of the bulb, said switch capsule comprising a tubular insulated member having a chamber therein, spaced electrical contacts disposed in said chamber, and a body of mercury disposed in the chamber in such quantity that the body of mercury is spaced from one of the contacts when the switch capsule is axially horizontal and the body of mercury contacts both contacts when the switch capsule is substantially axially vertical, and elongated spring clips secured at one end to opposite sides of the barrel releasably interlocked with said spring fingers to prevent accidental rotational and longitudinal movements of the lamp.

References Cited in the file of this patent

UNITED STATES PATENTS

| | | |
|---|---|---|
| 1,695,987 | Steindorff | Dec. 18, 1928 |
| 1,762,809 | Bradford | June 10, 1930 |
| 2,280,457 | Sutcliffe | Apr. 21, 1942 |
| 2,401,014 | Paul | May 28, 1946 |
| 2,402,877 | Dial | June 25, 1946 |
| 2,763,773 | Morente | Sept. 18, 1956 |
| 2,777,940 | Spiro et al. | Jan. 15, 1957 |

FOREIGN PATENTS

| | | |
|---|---|---|
| 263,999 | Great Britain | Jan. 13, 1927 |